United States Patent
Gonen et al.

(10) Patent No.: US 7,975,073 B2
(45) Date of Patent: Jul. 5, 2011

(54) MIDDLEWARE SERVER FOR INTERFACING COMMUNICATIONS, MULTIMEDIA, AND MANAGEMENT SYSTEMS

(75) Inventors: Edward Gonen, Yoqneam Illit (IL); Shai Toren, Moshav (IL); Boris Rakhlin, Haifa (IL); Vladislav Rafael, Zichron (IL)

(73) Assignee: Polycom, Inc., Pleasanton, CA (US)

( * ) Notice: Subject to any disclaimer, the term of this patent is extended or adjusted under 35 U.S.C. 154(b) by 763 days.

(21) Appl. No.: 11/278,847

(22) Filed: Apr. 6, 2006

(65) Prior Publication Data

US 2007/0239899 A1    Oct. 11, 2007

(51) Int. Cl.
G06F 15/16 (2006.01)
H04L 12/26 (2006.01)
H04L 12/16 (2006.01)

(52) U.S. Cl. ......... 709/249; 709/231; 370/252; 370/260

(58) Field of Classification Search .................. 709/249, 709/231; 370/252, 260, 261
See application file for complete search history.

(56) References Cited

U.S. PATENT DOCUMENTS

| | | | |
|---|---|---|---|
| 3,974,343 A * | 8/1976 | Cheney et al. | 379/244 |
| 5,754,939 A * | 5/1998 | Herz et al. | 455/3.04 |
| 5,822,306 A * | 10/1998 | Catchpole | 370/261 |
| 6,029,195 A * | 2/2000 | Herz | 725/116 |
| 6,249,570 B1 * | 6/2001 | Glowny et al. | 379/88.22 |
| 6,259,969 B1 * | 7/2001 | Tackett et al. | 700/264 |
| 6,289,382 B1 * | 9/2001 | Bowman-Amuah | 709/226 |
| 6,332,163 B1 * | 12/2001 | Bowman-Amuah | 709/231 |
| 6,480,885 B1 * | 11/2002 | Olivier | 709/207 |
| 7,120,668 B2 * | 10/2006 | Manber et al. | 709/205 |
| 7,124,372 B2 * | 10/2006 | Brin | 715/751 |
| 2002/0064136 A1 * | 5/2002 | O'Neil | 370/267 |
| 2002/0159394 A1 | 10/2002 | Decker et al. | |
| 2002/0178163 A1 * | 11/2002 | Mayer | 707/10 |
| 2002/0196814 A1 * | 12/2002 | Mouton et al. | 370/493 |
| 2003/0065721 A1 * | 4/2003 | Roskind | 709/204 |
| 2003/0182391 A1 * | 9/2003 | Leber et al. | 709/217 |
| 2003/0220972 A1 * | 11/2003 | Montet et al. | 709/204 |
| 2004/0019637 A1 * | 1/2004 | Goodman et al. | 709/204 |
| 2004/0064335 A1 * | 4/2004 | Yang | 705/1 |
| 2004/0071100 A1 * | 4/2004 | Klaghofer | 370/261 |
| 2004/0117444 A1 * | 6/2004 | Goodman et al. | 709/204 |
| 2004/0122810 A1 * | 6/2004 | Mayer | 707/3 |
| 2004/0128353 A1 * | 7/2004 | Goodman et al. | 709/204 |

(Continued)

OTHER PUBLICATIONS

U.S. Appl. No. 09/708,898 entitled "A System and Method for Controlling One or More Multipoint Control Units as One Multipoint Control Unit" filed Nov. 8, 2000; Roni Evens, et al.

*Primary Examiner* — Patrice L Winder
*Assistant Examiner* — Ebrahim Golabbakhsh
(74) *Attorney, Agent, or Firm* — Wong, Cabello, Lutsch, Rutherford & Brucculeri LLP (57) ABSTRACT

Disclosed herein is a middleware server for interfacing a Multipoint Conferencing Unit (MCU) with a communication system and/or a management system within the context of an organization. The middleware server uses modular architecture, making the middleware server highly adaptable to different types of communication systems and management systems. The middleware server is useful for interfacing a MCU with communication devices including Plain Old Telephone Service (POTS) telephones, Internet Protocol telephones (IP-phones), and multimedia endpoints and with management applications such as exchange servers and databases. The middleware server is useful for managing multimedia sessions according to organizational policies.

22 Claims, 7 Drawing Sheets

U.S. PATENT DOCUMENTS

| | | | |
|---|---|---|---|
| 2004/0249811 A1* | 12/2004 | Shostack et al. | 707/5 |
| 2005/0015350 A1* | 1/2005 | Foderaro | 706/20 |
| 2005/0047336 A1 | 3/2005 | Decker et al. | |
| 2005/0055416 A1* | 3/2005 | Heikes et al. | 709/207 |
| 2005/0058088 A1 | 3/2005 | Decker et al. | |
| 2005/0086211 A1* | 4/2005 | Mayer | 707/3 |
| 2005/0091380 A1 | 4/2005 | Gonen et al. | |
| 2005/0254440 A1* | 11/2005 | Sorrell | 370/264 |
| 2005/0288944 A1* | 12/2005 | Leman et al. | 705/1 |
| 2006/0069546 A1* | 3/2006 | Rosser et al. | 704/9 |
| 2006/0143569 A1* | 6/2006 | Kinsella et al. | 715/752 |
| 2006/0253458 A1* | 11/2006 | Dixon et al. | 707/10 |
| 2006/0253578 A1* | 11/2006 | Dixon et al. | 709/225 |
| 2006/0253581 A1* | 11/2006 | Dixon et al. | 709/225 |
| 2006/0253583 A1* | 11/2006 | Dixon et al. | 709/225 |
| 2006/0253584 A1* | 11/2006 | Dixon et al. | 709/225 |
| 2008/0109473 A1* | 5/2008 | Dixon et al. | 707/102 |
| 2008/0114709 A1* | 5/2008 | Dixon et al. | 706/13 |

* cited by examiner

MIDDLEWARE SERVER FOR INTERFACING COMMUNICATIONS, MULTIMEDIA, AND MANAGEMENT SYSTEMS

FIELD OF THE INVENTION

The present disclosure relates to multimedia multipoint conferencing and more particularly to a system and method for interfacing between a multimedia system and other communication systems or management systems.

BACKGROUND

Companies and organizations use audio/video conferencing and multipoint conferencing to improve communication and efficiency within the organization. Large organizations might distribute a large number of multimedia endpoints throughout the organization. Usually, one or more multipoint control units (MCUs) serve the internal multipoint multimedia conferencing needs of these endpoints. Organizations that do not have private MCUs may purchase conferencing services from a multimedia conferencing service provider that has one or more MCUs.

A multimedia endpoint is a networked terminal that is capable of providing real-time, two-way audiovisual communication with other terminals or an MCU. An endpoint can provide speech only; speech and video; or speech, data and video communication. An MCU is a conference control entity located at a node of the network or in a terminal. The MCU receives multiple media channels from endpoints via access ports. According to certain criteria, the MCU processes audiovisual and data signals and distributes the processed signals to the connected channels. Examples of MCUs include the MGC-100 (Polycom Inc.). A more thorough definition of an endpoint (terminal) and an MCU can be found in the International Telecommunication Union ("ITU") standards, such as but not limited to the H.320, H.324, and H.323 standards. Additional information regarding the ITU standards can be found at the ITU website.

Usually a MCU that is located in a terminal has limited functionality. For example, such an MCU might be capable of conducting a conference of only up to four participants. Model number VSX 8000 (Polycom Inc.) is an example for a terminal that includes an MCU.

Organizations may use one or more communication systems for multimedia communication services such as audio and/or video and/or data collaboration. Audio conferencing services can run over an IP network or a circuit switch network. Such communication systems may include PBX or IP-PBX offering audio services. Furthermore, an organization might also have different types of multimedia endpoints (video and data), and one or more MCUs that can be used for multimedia conferencing. Each of these services might run over different systems, including multiple audio, multimedia, and data systems. Usually there is no interface between these systems, although some end user equipment can be connected to both audio and to multimedia/data systems. Various management tools, applications, servers and systems are used for scheduling physical meetings and/or virtual meetings (multimedia conferences). Other management tools used to manage an organization may include information on employees of an organization.

In some cases it would be beneficial to associate the different communication systems and/or to associate multimedia conferencing systems with the organization management tools (applications). Associating the different applications will improve the utilization of the communications services. For example, an organization may wish to use its common scheduling services to reserve or schedule a virtual meeting (a multimedia conference) in the same way that the organization would schedule a common meeting. An exemplary system for associating scheduling services of an organization with is multimedia conferencing system is disclosed in U.S. patent application Ser. No. 10/960,337, filed on Oct. 7, 2004, Ser. No. 10/954,934, the entire contents of which are incorporated herein by reference.

Presently, associations between different systems require a unique solution for each system. Such a solution must be adapted to the requirements of the particular organization and the requirement of the particular systems to be associated. For example, different types of controllers for audio systems (PBX or IP-PBX) require different solutions, as does the controller of multimedia systems (MCU). For associating video conferencing with a scheduling system, the solution must be adapted to the requirements of the video conferencing system, the scheduling server, and the organizational management application (e.g. employee database), for example.

But regardless of what systems are associated, the association requires a central authority (e.g. an interfacing server or middleware server) to oversee the association, to track the topology, and to manage communications within the entire system. In an organization having multiple resources at its disposal, such a central authority might decide whether a MCU and/or PBX should be involved; what is the most suitable MCU and/or PBX; which communication protocols to use; how to collect endpoint address or dialing number; etc. Such decisions are usually made based on multiple inputs and require a high-level of expertise and knowledge from a person who is responsible for overseeing such organization resources.

Therefore, there is a need in the art for a node (i.e. a middleware server) containing algorithms and methods to facilitate the decision making processes involved in associating various communications resources. Such a middleware server would communicate with the controller of the multimedia system to established and control one or more multipoint multimedia conferences and would communicate with the audio system controller and/or the management applications servers. Such a middleware server would be easily adapted to different types of communication systems, management applications, and organizational needs and policies.

SUMMARY

A system is disclosed for interfacing one or more multimedia conferencing systems, one or more other communication systems, and/or one or more management systems. The disclosed system can be implemented, for example, within the context of an organization. The interfacing system uses a flexible architecture and is adaptable to different environments in the organizational premises and to the different needs of the organization. An exemplary embodiment is a middleware server (MWS) that provides a set of algorithms for managing communication and interfacing Audio/Video/Data conferencing and organizational management. Furthermore the MWS can provide other basic services such as but not limited to topology handling, device control, etc. Examples of such services can include establishing and controlling a conference, endpoints management and control service, etc.

The disclosed MWS may have several layers including: a bank of multimedia applications, a data storage facility layer, an interfacing layer and a business logic layer. The data storage facility can be implemented by database, Non-Volatile Read Write Memory, Random Access Memory (RAM), etc. As used herein, the term 'database' may represent any data storage facility. The database (DB) can include several sections, such as a system section (SSDB), a site DB and an active sessions DB (ASDB). The SSDB may include information on different types of communication devices such as but not limited to different terminals, multimedia endpoints, IP-Phones, controllers (MCU, PBX, IP-PBX); scheduling systems; exchange servers such as MICROSOFT EXCHANGE SERVER™, (Microsoft); management systems; etc. The site DB may include information that is relevant to a current site (the organizational premises in which the MWS is installed) including but not limited to user names, addresses (dial-in numbers, IP address, etc.), type of endpoints, topology, etc. The site DB can be adapted and configured during the installation of the system and can be updated by an administrator of the organization. The ASDB is a section in the DB in which each of the applications (e.g. multimedia, interfacing applications or business logic applications) stores information used for their operation or resulting of their operation to be shared with the other application. The ASDB is organized according to active sessions.

The bank of multimedia applications can include a plurality of applications required for establishing and controlling a multimedia conference. Exemplary applications may include: device managers, user mangers, endpoints drivers, MCU controllers, H.323 gatekeepers, SIP components, etc. The interfacing layer may include an API module for interfacing with the different applications and/or a GUI for interfacing with an administrator. The business logic is a software program designed to meet the unique requirements of the organization and/or the other communication system that are installed in the organizational premises and/or the unique requirements of the organization management system. The business logic layer is adapted to control the different modules via an API according to the requirements of the site and the needs of the organization.

BRIEF DESCRIPTION OF THE DRAWINGS

The disclosure will be more readily understood from reading the following description and by reference to the accompanying drawings, in which.

DETAILED DESCRIPTION

Figure 1:
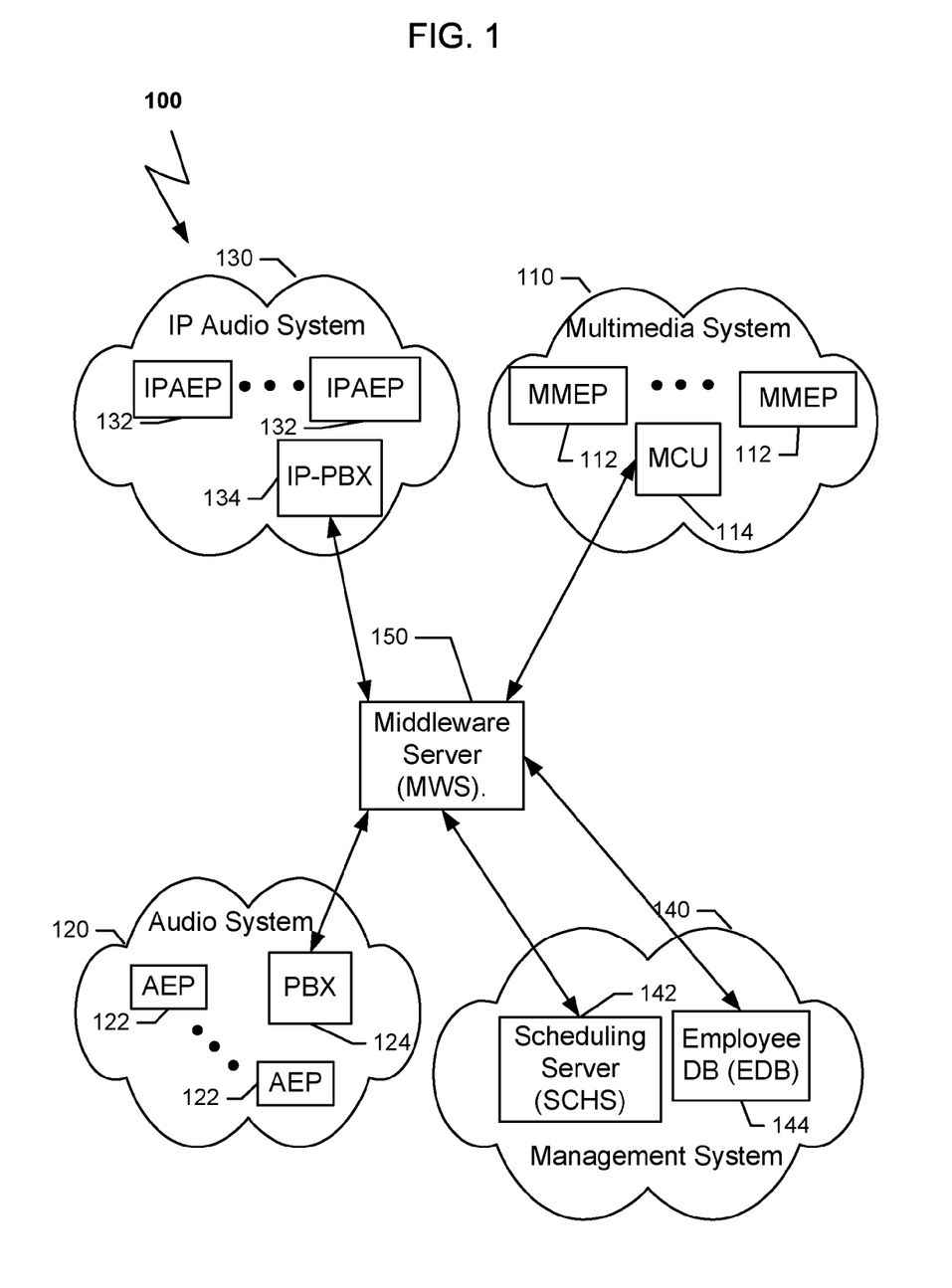
FIG. 1 illustrates an organization premises having a variety of electronic systems.

FIG. 1 is a block diagram illustrating an organization premises 100 having a multimedia system 110, an internet protocol (IP) audio system 130, a circuit switch audio system 120, a management system 140 and a middleware server (MWS) 150 that interfaces between those systems. Within each system cloud 110, 120, 130 and 140, elements of the system can communicate via a local network that can be a packet-switched network and/or circuit switched network. Those skilled in the art will appreciate that the number of systems, elements within a system as well as the MWS 150 shown in FIG. 1 are only exemplary and not limiting. It will be appreciated that the term organization premises is not limited to a physical location or structure. Exemplary audio system 120 can run over a circuit switch network such PSTN and among other elements may include a plurality of audio endpoints (AEP) 122 (such as but not limited to POTS (plain old telephone service) telephones, conference room telephone such as VTX1000™ (Polycom Inc) etc.). In addition audio system 120 can include a private switching box PBX 124. PBX 124 can be a private switching box for routing calls between the different AEP 122, for audio conferences, and as interface between AEP 122 and the world outside cloud 120.

IP audio system 130 can run over an IP network and may include a plurality of IP audio endpoints (IPAEP) 132 (such as but not limited to Sound Point IP 4000™ (Polycom); personal computers (PC), laptop computers, etc. capable of enabling audio sessions over an IP networks, etc.) and IP-PBX 134. IP-PBX 134 can be used as a private switching box for routing calls between the different IPAEP 132, for audio conferences, and as an interface between the IPAEP 132 and the world outside cloud 130.

Multimedia system 110 can include one or more multipoint control units (MCU) 114 and a plurality of multimedia endpoints (MMEP) 112. Some of the MMEP 112 can run over an IP network, some over a circuit switch network, and some over both networks. Some of the MMEP 112 can also be used as an IPAEP 132 and vice versa. Some of the MMEP 112 can be used as an AEP 122 and vice versa. MCU 114 can be used for conducting multipoint audio and/or video and/or multimedia sessions between the different MMEP 112 and between some of the AEP 122 and/or some of the IPAEP 132. Point to point (PTP) multimedia session can be handled directly by the MMEP 112 or via MCU 114 if transcoding is needed. Transcoding is needed if the two endpoints are running over networks that use different communication protocols or the endpoints are using different compression standards, different bite rate, etc. In such cases MCU 114 serves as a gateway for converting protocols and/or compression standards, etc.

Management system 140 is used for common operation of the organization and may include a scheduling server (SCHS) 142 such as MICROSOFT EXCHANGE SERVER™ (Microsoft) and an employee database (EDB) 144 that can include information on the employees of the organization including information such as names, employee's ID number, list of security permissions, email address, telephone numbers, IP address, etc. Management system 140 may include other servers that are not shown, for example email servers, organizational web sites, etc.

Middleware server (MWS) 150 is installed in the organizational premises 100 and can communicate with the one or more MCU 114, IP-PBX 134, PBX 124, SCHS 142 and EDB 144. In other embodiments, MWS 150 can additionally communicate directly with some of the IPAEP 132, MMEP 112, and AEP 122. The communication between MWS 150 and the different elements of premises 100 can be conducted over an IP network or any other data communication network that is used over the organizational premises 100. In the present description an IP network is used as an exemplary network for the communication between MWS 150 and the other elements of premises 100.

In one embodiment, MWS 150 can be implemented as an independent server. In other embodiments MWS 150 can be embedded within MCU 110, IP-PBX 130 or PBX 124 or other element of the organizational premises 100. MWS 150 is adapted to interface between the different communication systems (110, 120 and 130) according to the requirements of the organization to reserve, establish, and conduct multipoint multimedia conferencing sessions over the one or more communicational networks 110, 120 and 130. More information on the operation of MWS 150 is disclosed below in conjunction with FIGS. 2*a, b* & *c*, 3, 4, and 5.

Figure 2A:
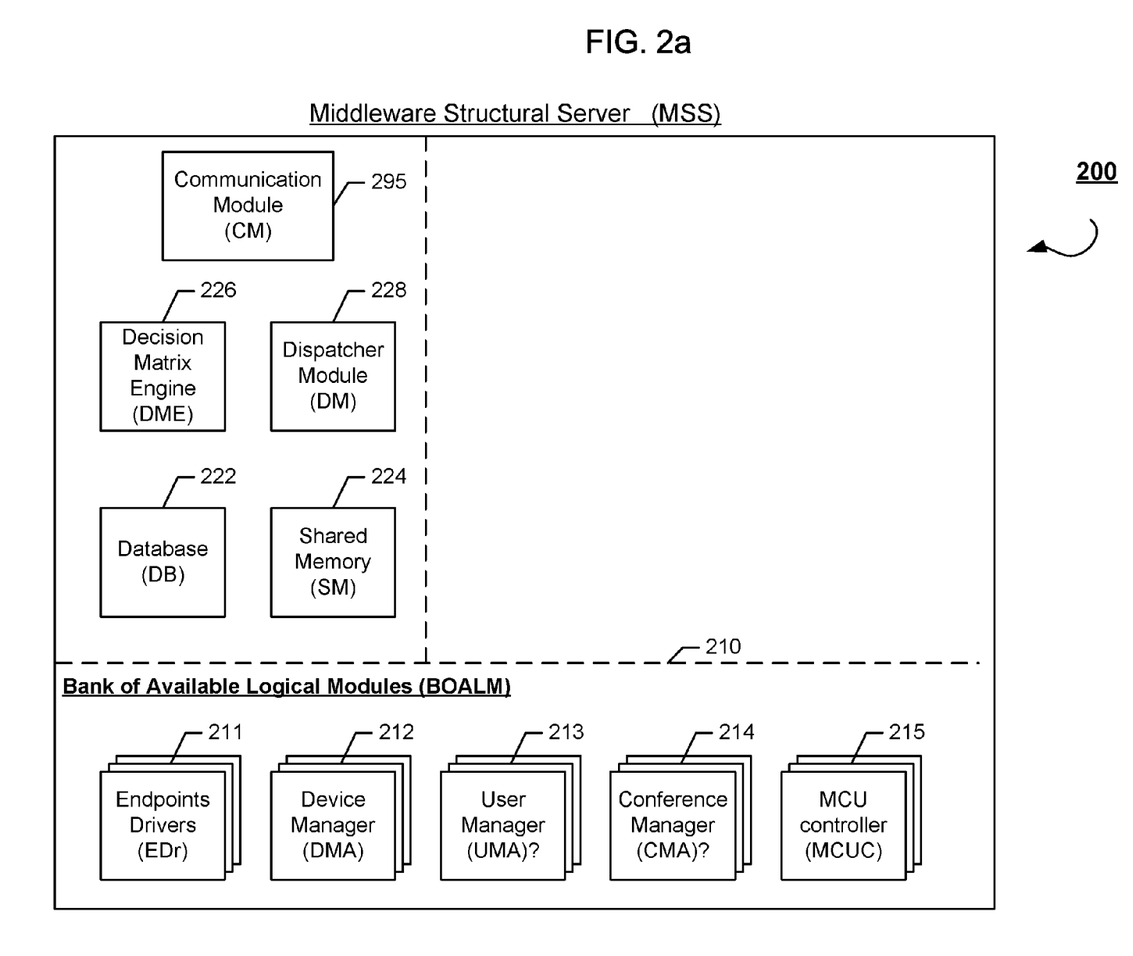
FIG. 2a is a simplified block diagram of a middleware structural server (MWSS)
Figure 2B:
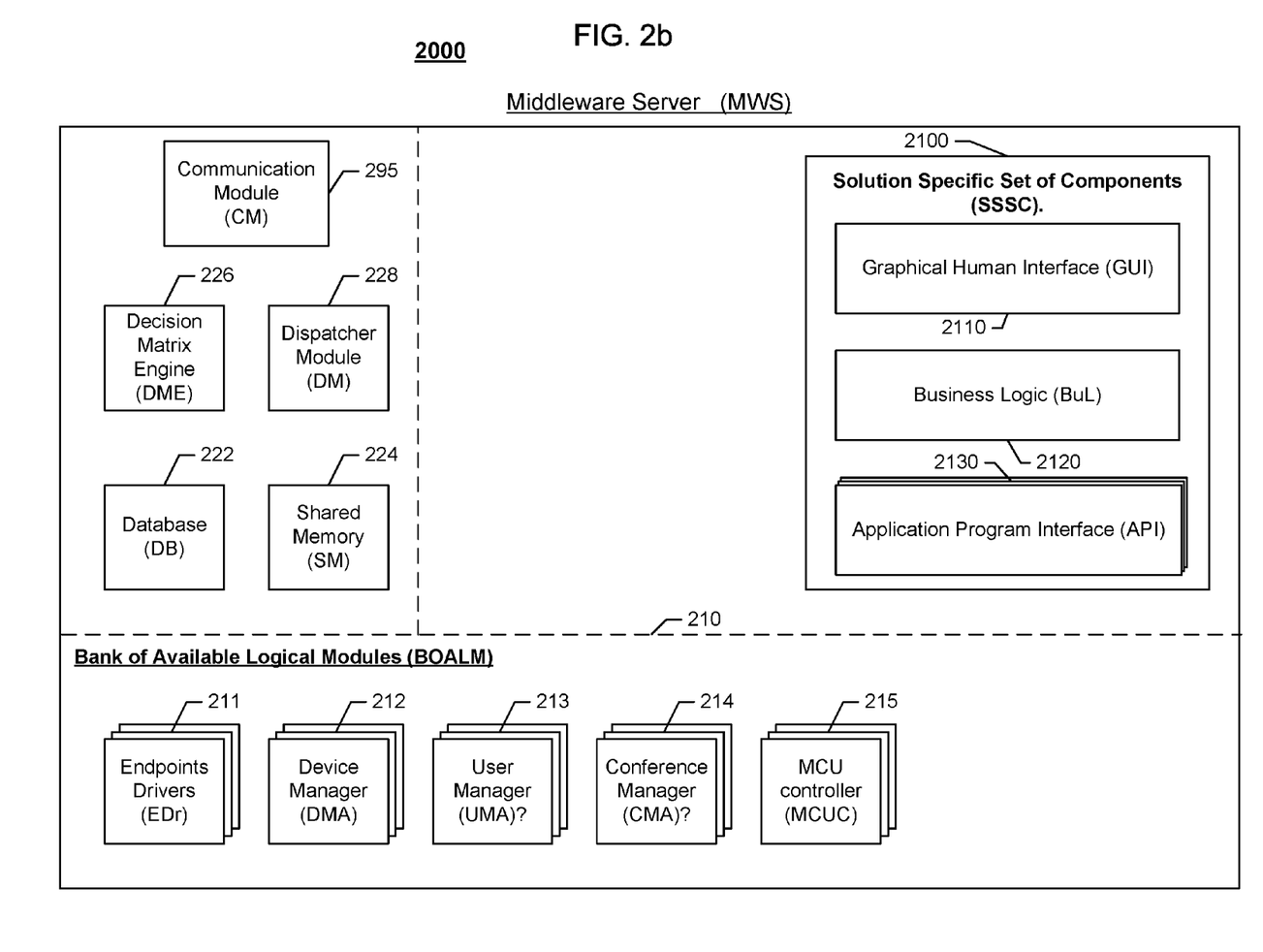
FIG. 2b is a simplified block diagram of a middleware server (MWS) after installation at a premises of an organization.
Figure 2C:
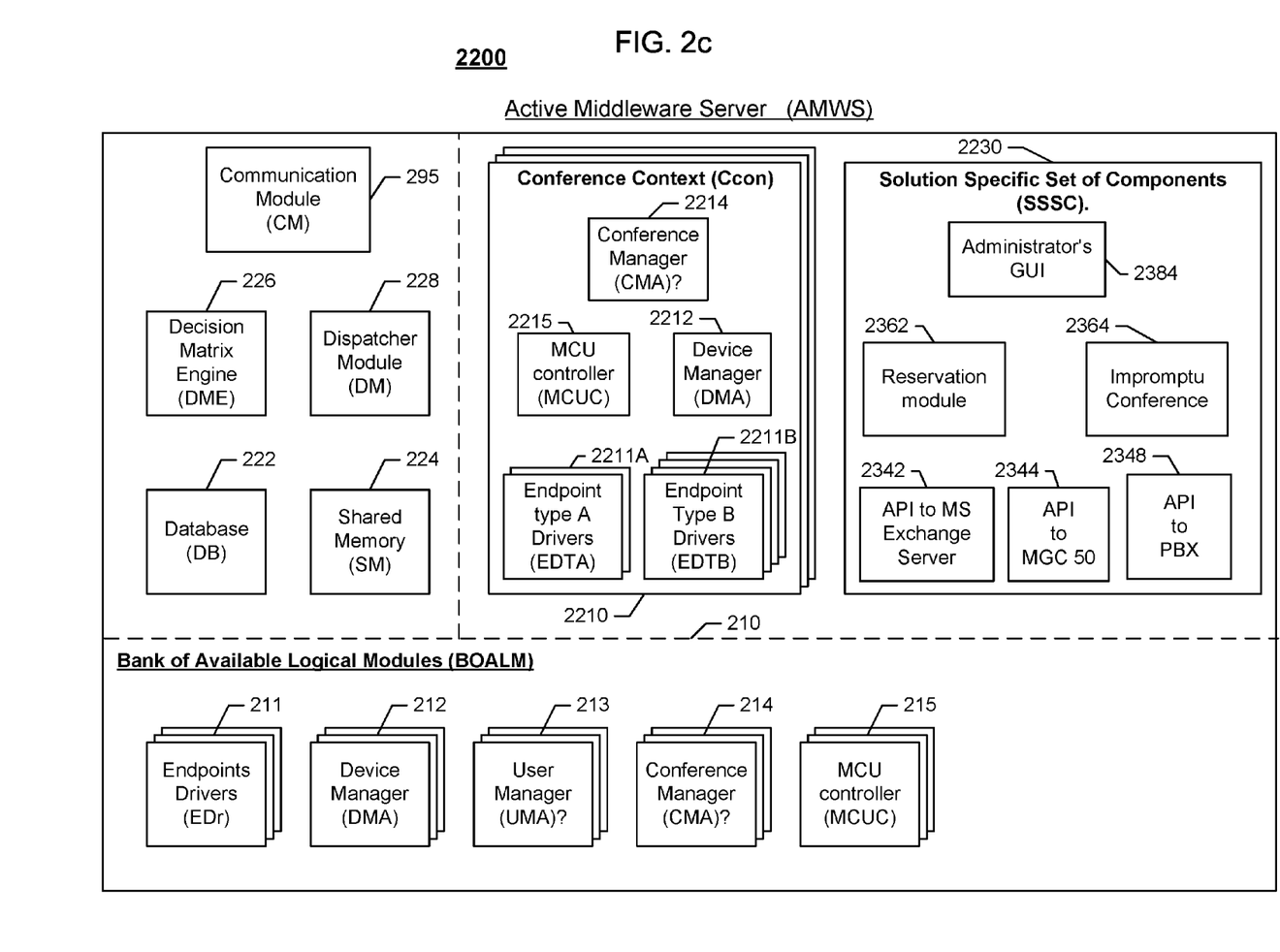
FIG. 2c is a simplified block diagram of active middleware server (AMWS) conducting conferencing sessions.

FIG. 2*a* is a block diagram an exemplary structure of a MWS, referred to herein as a middleware structural server (MWSS) 200. FIG. 2*a* illustrates the modular nature of the MWSS 200, illustrating many of the functional modules needed for interfacing different communicational and management systems to established and control one or more multimedia conferences in generic organizational premises. Additional modules are needed for adapting the MWSS 200 for installation and operation in a particular organizational premise, such as the one illustrated in FIG. 1 because of the particular needs of the organization and the systems that are installed in the organization premises. Those modules are depicted below in conjunction with FIG. 2*b*. Furthermore, FIG. 2*c* illustrates exemplary modules of MWS 150 (FIG. 1) during operation.

Referring to FIG. 2*a*, a functional MWSS 200 can include a plurality of modules, for example: a bank of available logical modules (BOALM) 210, database (DB) 222, shared memory (SM) 224, decision matrix engine (DME) 226, dispatcher module (DM) 228, and a communication module (CM) 295. MWSS 200 can include other modules that are not shown in FIG. 2*a*, for example a web services module (WSM).

Dispatcher module (DM) (228) is the managing module of the MWS and controls the operation of the entire MWS. DM 228 is described in more detail below, following an overview of the other modular components of the MWSS 200.

The BOALM 210 can include several groups of logical modules 211 to 215, each group including a plurality of logical modules having the same functionality, but adapted to different types of equipment. As used herein, a logical module can be a physical entity or a logical entity that is composed from physical entities allocated to the logical module by the DM 228 when the logical module is needed in a context associated with a new conference. A logical module may be software, including a computer program, routine, or code, for example. Although three logical modules in a group are illustrated in BOALM 210, the present disclosure is not limited to a particular number and the presented configuration is intended to be illustrative of an exemplary configuration.

BOALM 210 includes a group of endpoint drivers (EDr) 211, a group of device manager applications (DMA) 212, a group of user manager applications (UMA) 213, a group of conference manager applications (CMA) 214, and a group of MCU controller (MCUC) 215. Other logical modules not illustrated can include a group of SIP components (SIPC) and/or a group of H.323 gatekeeper modules.

The group of EDr 211 can include driver applications for a plurality of types of endpoints. Exemplary endpoints include VSX8000™ and VSX7000™ (Polycom Inc.). For a given conference, two or more EDrs 211 are selected or created by DM 228 and assigned to a context associated with that conference according to the type of endpoints that are to be connected in the conference. An exemplary EDr can be adapted to communicate with its associated endpoint via CM 295 and inform the user to dial a certain ISDN number or an IP alias of an MCU for joining the conference. Alternatively, the endpoint can be adapted to automatically dial to the MCU to join a conference. Exemplary methods for instructing an endpoint to set a connection with an MCU are disclosed in U.S. patent application Ser. No. 10/941,790, the entire contents of which are incorporate herein by reference. If the associated endpoint cannot be instructed or informed to call an MCU, then EDr 211 can send the dialing number of the endpoint to a queue assigned to the relevant MCUC 215. The MCUC 215 can retrieve the information from its queue and instruct the MCU to dial the endpoint. Such an endpoint can be a POTS telephone, for example.

Upon initiation, each EDr 211 can be introduced to locations in the shared memory SM 224 and/or DB 222 of the queues to/from EDr 211 and can store or retrieve information, instructions, and or statuses relevant to its associated endpoint. In addition, EDr 211 is informed of locations in the system section of the DB 222 (SSDB) from whence information on the type of the endpoint can be retrieved. Exemplary information can include bit rates, compression standards, etc. In addition, EDr 211 can be informed of the location in the active sessions of the DB 222 (ASDB) from whence information on its current connected endpoint can be gathered. Exemplary information can be IP address of the relevant endpoint, ISDN number, bandwidth of the actual communication line, display size, etc.

A device manager DMA 212 can be assigned to a context associated with a conference for managing the operation of two or more EDrs 211 that are associated with the same context. DMA 212 can be created by DM 228 and assigned to a context that will be associated to the conference. Upon initiation each DMA 212 can be introduced to locations in the shared memory SM 224 and/or DB 222 of the queues to/from DMA 212 and can store or retrieve information, instructions, and/or statuses relevant to its operation. Exemplary queues can be the queues of the relevant EDrs 211 and the relevant CMA 214 that are assigned to the same conference. An exemplary DMA 212 can be adapted to communicate with the endpoints that participate in the conference via the relevant EDrs 211. The communication can include transferring of instructions that were received from the conference manager application (CMA) 214 and targeted to one or more endpoints. Exemplary instructions include instructing certain endpoints to set a connection with a certain dial in number of an MCU. The instruction can be placed in the queue that is associated with the relevant DMA 212 by the CMA 214 associated with the conference. The DMA 212 distributes the command to the appropriate EDrs 211 via their queues, waits for receiving status information on the success of setting the connection, and sends the status information to the CMA 214.

UMA 213 is a logical module adapted to handle functions that are related to a user, such as the user's dial in number or IP address, type of equipment etc. Exemplary functions include updating user information in the database DB 222.

CMA 214 can be created by DM 228 and be assigned to a context to be associated with a conference for managing the establishment of the conference, checking the validity of the different connections of the conference (endpoints and MCU), etc. CMA 214 may communicate with the decision matrix engine DME 226 for determining the best topology for the conference, such as alternative communication links in case that one or more connections are terminated unsuccessfully, etc.

Upon initiation each CMA 214 can be introduced to locations in the shared memory SM 224 and/or DB 222 of the queues to/from CMA 214 and can store or retrieved information, instructions and or statuses that are relevant to its operation. Exemplary queues include queues of the relevant DMA 212, the relevant MCUC 215 assigned to the same conference, and the DME 226. An exemplary CMA 214 can be adapted to perform several tasks that are associated with the conference include defining the best topology for the conference. The best topology can be based on cost of the connection, bandwidth, availability, quality, etc. To reach its decision, DME 226 can be used. DME 226 can be informed on the different parameters of the endpoints and/or MCU in order to define the best topology. After defining the topology, a connection establishment command may be sent via DMA 212 and MCUC 215 to the endpoints and/or MCU. Upon receiving status information on the connection, CMA 214 may consider alternative topology for replacing unsuccessful connection. Furthermore, CMA 214 may get information on the required layout of the conference and transfer the layout information to the MCUC 215.

MCUC 215 can be assigned to a context associated with a conference for managing the operation of an MCU that is associated with the same conference. MCUC 215 can be created by DM 228 and assigned to a context that will be associated to the conference. Upon initiation each MCUC 215 can be introduced to locations in the shared memory SM 224 and/or DB 222 of the queues to/from MCUC 215 and can store or retrieve information, instructions and/or statuses that are relevant to its operation. Exemplary queues can be queues of the relevant DMA 212 and the relevant CMA 214 that are assigned to the same conference. An exemplary MCUC 215 can be adapted to communicate with the MCU via CM 295. The communication can include transferring instructions received from the conference manager application (CMA) 214 and targeted to the MCU. Exemplary instructions include instruction to set a connection with certain endpoints. The instruction can be placed in the queue associated with MCUC 215 by the relevant CMA 214. The MCUC 215 sends the command to the relevant MCU via CM 295, waits for receiving status information on the success of setting the one or more connections with the endpoints, and sends the status information to the CMA 214.

The database (DB) 222 can comprises several sections, including a system section (SSDB), a site DB, and an active sessions DB (ASDB). The SSDB may include information on different type of communication devices such as different terminals IP-Phones, multimedia endpoints, controllers (MCU, PBX, IP-PBX), scheduling system, management system, etc. The SSDB is prepared by the vendor of MWSS 200 and can be sorted according to device type. The site DB may include information relevant to a current site (the organizational premises in which the MWS is installed) including user names, addresses (dial-in numbers, IP address, User's address book, etc.), type of endpoints, topology, etc. The site DB can be sorted according to user's name, controller ID number, etc. This section can be adapted and configured during the installation of the system and can be updated from time to time by an administrator of the organization. The ASDB is a section in the DB in which each of the different modules of the MWS (multimedia, interfacing applications or business logic applications) store information used for their operation and store results of their operation to share with other modules. This section is organized according to active sessions.

SM 224 can be implemented by a random access memory (RAM) that is used for interfacing between the different modules that are currently active. SM 224 may contain a bank of queues. Each queue can be associated with a current active module of the MWS. From such a queue each active module can retrieve information or a pointer to the next information or instruction that the module will need during its next process. The information itself can reside in the DB 222. This pointer and/or the information are placed in the queue by another active module that used or created this information. In some exemplary embodiment of the present invention SM 224 can be embedded as a logical part in DB 222.

DME 226 may comprise a bank of algorithms that can be used by dispatcher 228 or by active CMA 214 when a decision is needed. For example DME 226 may be requested to give the best topology for a certain conference in order to define the connections between the different endpoint and the MCU for a certain conference. The decision can be based on parameters such as the cost of the leasing lines, quality, bandwidth, available resources etc. When a connection has been unsuccessfully terminated DME 226 can be requested to define the $2^{nd}$ best topology. Exemplary decision algorithms are depicted in U.S. patent application Ser. No. 10/941,790, the entire contents of which are incorporate herein by reference.

CM 295 is in charge on the communication between the MWS and other equipment. For implementing data communication over a network using the Open System Interconnection (OSI) reference model, CM 295 is adapted to handle the first four layers: the physical layer 1, link layer 2, network layer 3, and the transport layer 4 (the TCP stack). In addition CM 295 may include a H.323 Gatekeeper Stack for working in H.323 protocol, and/or SIP stack for working in SIP protocol and/or HTTP server for working also as a web-server. In another embodiment CM 295 may include a communication module for communicating over ISDN, regular phones etc.

As indicated above, dispatcher module (DM) 228 is the manager of MWSS 200. DM 228 may receive requests from a business unit (FIG. 2b) via an API (FIG. 2B). Based on the request, DM 228 can allocate resources from BOALM 210 according to the request, create a context with those resources, and associate the appropriate logical modules with relevant locations in the site DB. For example, the location of information on a certain user in the site section of DB 222 is transferred to the relevant UMA 213 and the relevant EDr 211 and the relevant queues in SM 224 are assigned to the appropriate logical module, etc. DM 228 may use the services of DME 226 to determine the best configuration of the context.

After establishing and initiating the context, DM 228 may receive status information on the operation of the context. Based on this information, DM 228 may consider replacing some of the logical modules with others or terminating the context or part of the context and releasing their resources back to BOALM 210 or to SM 224, etc. If an indication is received that a connection with a multimedia endpoint is unsuccessfully terminated or could not be established, a decision can be made to replace the endpoint, for example, by connecting the user via his audio equipment, cellular or IP phone or regular phone. According to the decision, the current user's EDr 211 may be released and a new EDr that fits the audio device can be allocated. Furthermore, the appropriate logical modules in the context can be informed about the change by the DM 228. More information on the operation of MWSS 200 and its internal modules is disclosed below in conjunction with FIGS. 2b & c, 3, 4, and 5.

FIG. 2b is a functional block diagram with relevant modules of an exemplary middleware server (MWS) 2000 installed and adapted to operate in a particular organization. As such, MWS 2000 includes all the elements that belong to the MWSS 200 and were depicted above in conjunction with FIG. 2a. In addition, MWS 2000 includes a solution specific set of components (SSSC) 2100. SSSC 2110 provides functional modules that are specifically needed to solve the requests/needs of the organization in which the MWS 2000 is installed and for adapting the operation of MWS 2000 to the needs of the systems that are installed in the organization premises. Exemplary SSSC 2110 may include one or more application program interfaces (API) 2130, a business logic module (BuL) 2120 and a graphical human interface (GUI) 2110 to be used by an administrator of the organization.

Each one of the modules of SSSC 2100 is designed and adapted to the needs of the organization. For example, SSSC 2100 may include an API for each one of the systems that are installed in the organizational premises 100 (FIG. 1). For example if the multimedia system 110 (FIG. 1) includes two or more types of MCUs 114, an API for each type of MCU is needed. An API is needed for each type of PBX 124 and/or each type of IP-PBX 134 that are installed in premises 100. Furthermore an API may be needed for interfacing with a scheduling server 142 and EDB 144.

Different scheduling servers can be used by the organization for secluding conferences. Some of them may be popular scheduling servers that are used for inviting people to common meeting and reserving common meeting rooms. An exemplary popular scheduling server is MICROSOFT EXCHANGE SERVER™ (Microsoft). Other scheduling servers can include those used for reserving and scheduling resources for virtual meeting (audio and/multimedia conferences). Exemplary scheduling servers for virtual conferences are disclosed in U.S. patent application Ser. Nos. 09/708,898; 09/790,577; 10/960,337 and 10/941,790 the entire contents of which are incorporated herein by reference. Other type of scheduling servers can also be used by exemplary organizations. SSSC 2100 may include an API 2130 for each type of scheduling servers that are used by the particular organization.

BuL 2120 is adapted to the requirement of the organization and its one or more policies if such exist. For example, BuL 2120 may include a set of rules defining employees' rights for scheduling a multimedia session, security limitation for preventing access to multimedia conferences, maximum length of a multimedia session, type of layouts, policy for selecting one or more speakers in a conference, maximum number of conferees in a conference, etc. GUI 2110 can also be adapted to the requirements of the organization and may include the logo of the organization, the same icons used in the organization site, same maintenance page-format that is used by the administrator of the network, etc.

An alternate exemplary embodiment of the present invention may offer default components for SSSC 2100. The default components can be API modules for popular systems. A default BuL 2120 may not include any unique limitation or policy and may accept any request as long as resources are available. A default GUI 2100 can be delivered, the GUI may not include any shape or information that is unique to the organization. Yet an alternate exemplary embodiment of the present invention may offer a default SSSC 2100 and give tools to the organization to change the default components according to its needs.

FIG. 2c is a functional block diagram with relevant modules of an exemplary active middleware server (AMWS) 2200 during operation in a particular organization at a particular time. Therefore, AMWS 2200 includes elements belonging to the MWSS 200 and MWS 2000, as shown and described in conjunction with FIG. 2a&b. In addition, AMWS 2200 includes a solution specific set of components (SSSC) 2230 with components that match the needs of the organization. Moreover, AMWS 2200 includes one or more conference contexts 2210 that are associated with conferences that are conducted by AMWS 2200 at the time of the particular time illustrated in FIG. 2c. Although three conference contexts 2210 are illustrated, the presented configuration is intended to be illustrative only; any number of conference contexts could exist.

For clarity and simplicity of the explanation and without any intention to limit other embodiments to this scenario, the exemplary organization that is associated with the example of AMWS 2200 may include among other equipment, a MICROSOFT EXCHANGE SERVER™ (Microsoft) as the scheduling server 142 (FIG. 1), an MGC 50™ (Polycom Inc.) as the MCU 114 (FIG. 1) and PBX 124 (FIG. 1). Therefore, exemplary API layer 2130 (FIG. 2b) of the SSSC 2100 (FIG. 2b) may include API modules such as an API 2342 to MICROSOFT EXCHANGE SERVER™, an API 2344 to MGC 50™ and an API 2348 to PBX 124. Other exemplary embodiments may use other APIs according to the need of the organization.

To satisfy the needs of the organization, exemplary BuL 2120 of FIG. 2b may include policies requested by the organization. Exemplary policies include rules concerning reservations and impromptu conferences. Therefore in the example of FIG. 2c the BuL layer of SSSC 2230 includes two modules, a reservation module 2362 and an impromptu conference module 2364. The reservation module 2362 may reflect the organizational rules concerning who is entitled to reserve resources for a conference and under what conditions of available resources to accept a reservation. For example, a reservation may be accepted if the requested resources are less than a certain percentage (10% to 40%, for example) of the available resources in the time to which the conference is reserved, etc.

The impromptu conference module 2364 may reflect the organizational rules concerning who is entitled to start a reservation-less or impromptu conference and under what conditions of available resources to allow an impromptu conference. For example, a request for an impromptu conference may be accepted if the requested resources are less than a certain percentage (10% to 30%, for example) of the current available resources, etc.

In order to fulfill the needs of the organization an exemplary GUI 2110 of FIG. 2b may include an administrator's GUI 2384. The administrator's GUI 2384 enables the administrator to interface with the MWS to configure the MWS according to the needs of the organization, for maintenance, or updating the database, etc.

During the time of the particular time depicted in FIG. 2c, one of the illustrated conference contexts 2210 is an ongoing conference that includes six participants. Out of these six conferees, two conferees have endpoints type 'A' and four conferees have endpoints type 'B', as illustrated by two endpoint type 'A' Drivers (EDTA) 2211A and four endpoint type 'B' Drivers (EDTA) 2211B. The six endpoint drivers are controlled by DMA 2212. To control the MCU of the organization, which is a MGC 50, context 2210 includes an MCUC 2215 that is adapted to control a MGC 50. CMA 2214 manages the activity of the context. CMA 2214 controls the relevant endpoints via DMA 2212, EDTAs 2211A and EDTBs 2211B, the MGC 50 via MCUC 2215 and API 2342; and the PBX via API 2348. More information on the operating of an exemplary MWS is described below in conjunction with FIGS. 3, 4, and 5.

Figure 3:
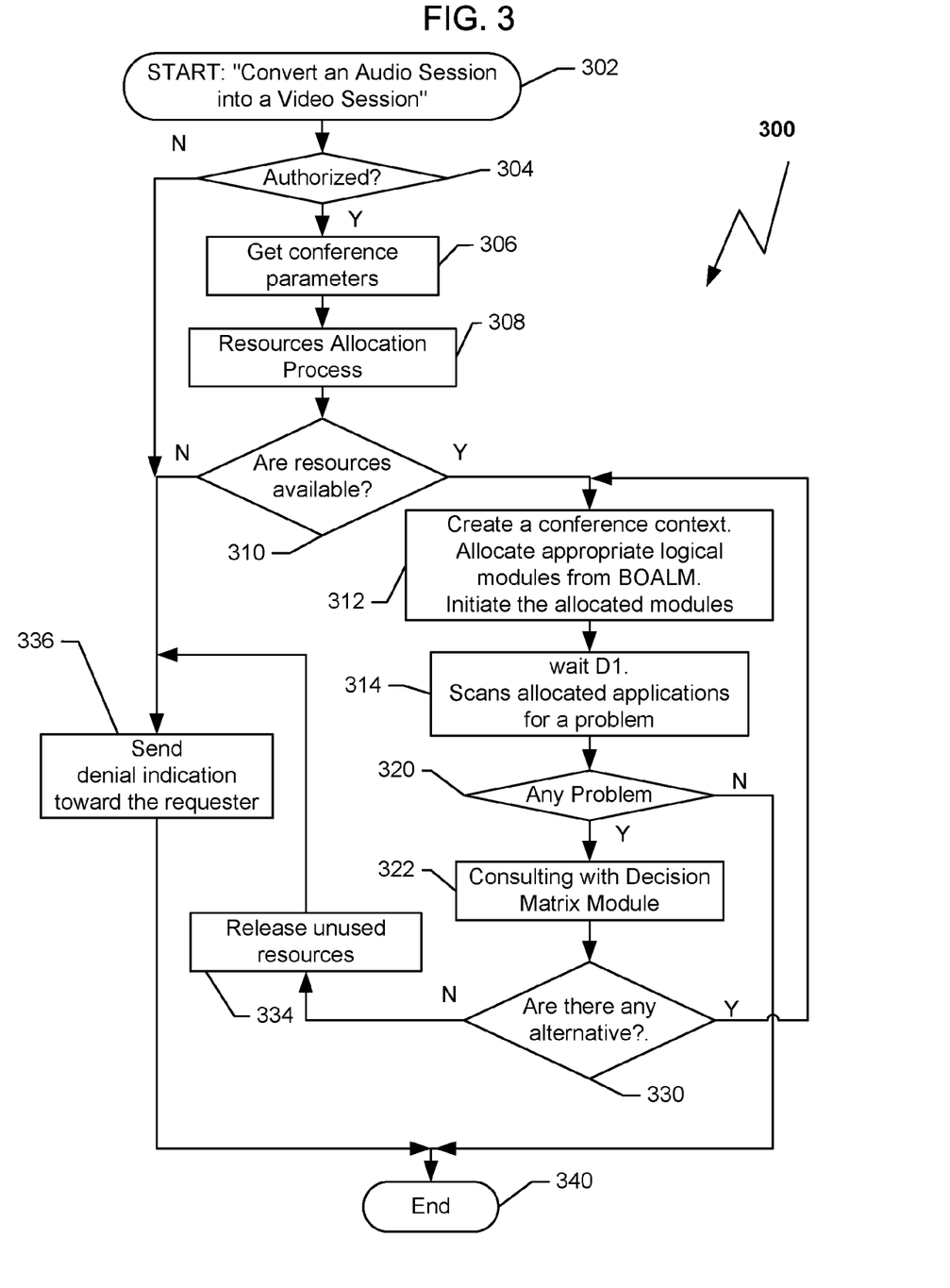
FIG. 3 is a flowchart illustrating relevant steps for upgrading an audio session into a video session.

FIG. 3 is a flowchart illustrating a process 300 for escalating an audio session into a video session. Process 300 may be initiated by one of the users requesting to convert an ongoing audio session that is currently conducted over audio system 120 (FIG. 1) into a multimedia session between the same conferees by using their multimedia endpoints 112 (FIG. 1) instead of or in addition to their Phones 122. The request can be initiated by pressing an appropriate key or combination of keys on the phone 124. The request is transferred to the PBX 124 that sends the request to CM 295 (FIG. 2), which processes the packet according to the communication protocols. The processed request is transferred to API 2348 that further processes the request and translates it to the format that is used over the AMWS 2200 (FIG. 2c). The translated request is placed in the queue of DM 228 (FIG. 2).

At step 302 the request is retrieved from the queue and is processed by DM 228 (FIG. 2c) and a decision is made 304 whether the requester is authorized to start a multimedia session. The decision can be received from the impromptu conference module 2364 (FIG. 2c) at the business logic layer of SSSC 2230 (FIG. 2c) that may get the ID number of the requester from DM 228. If the requester is authorized to start a multimedia session, then information on conferees that are currently associated with the audio session can be retrieved from PBX 124 (FIG. 1) via API 2348 (FIG. 2c). According to the associated conferees, information on their multimedia endpoints is retrieved 306 from the site section of the DB 222 (FIG. 2).

If 304 the requester is not authorized to start an impromptu conference a denial indication is sent 336 to the requester via API 2348 (FIG. 2c) to PBX 124 through CM 295 (FIG. 2c). Each intermediate module adapts the message according to is functionality. CM 295 processes the message according to the communication protocols and API 2348 translates the message to the format used over the PBX 124 (IVR for example). After sending the denial indication method 300 terminates 340 and DM may check its queue for the next packet. Conveying the information between the internal modules of AMWS 2200 (FIG. 2c) is done by placing the information in the queue that is associated to the relevant module.

Returning to step 306, after collecting information on the MMEP 112 (FIG. 1) associated with the one or more participants of the session, a resource allocation process is initiated 308. An exemplary resource allocation process can be conducted by DM 228 (FIG. 2c), DME 226 (FIG. 2c), and the MCU via its API 2342 (FIG. 2c) based on the information retrieved on the endpoints. Such information includes the type of networks that can be used (circuit switch or IP), type of compression standards, bit rates etc. DME 226 can recommend a best setup and topology for the session. The selection can be considered with the MGC 50 via its API 2342 (FIG. 2c). If resources are available 310, the allocation process 308 can be terminated and method 300 can proceed to step 312.

If resources are not available the allocation process may continue and DME 226 may offer a second configuration. If resources are available 310 to support the second setup the allocation process 308 can be terminated and method 300 can proceed to step 312. If resources are not available the allocation process may continue and DME 226 may offer another configuration, etc. This loop can proceed until DME 226 may determine 310 that there is no any possible setup that can be supported by the current available resources. Then method 300 may proceed to step 336 and deny the request and be terminated 340.

If 310 resources are available, then a conference context 2210 (FIG. 2c) is created 312, appropriate logical modules from the BOALM 210 (FIG. 2c) are allocated to the context, and the context is initiated. The appropriate logical modules can be EDr logical modules 211 that match the type of the endpoints, (two EDTA 2211A and four EDTB 2211B, FIG. 2c), a MGC 50 MCUC logical module 2215, DMA 2212, and CMA 2214. Furthermore, the logical modules are informed regarding the parameters of the session, including participant ID numbers, conference ID number, relevant queues, etc. This information can be used during operation to retrieve the appropriate data from DB 222 and SM 224 (FIG. 2c). The context is initiated and CMA 2214 may start a process for establishing the session. For example, a list of dial-out numbers of endpoints to which the allocated MCU has to dial is sent to the MCU via MCUC 2215 and to the API 2342 (FIG. 2c) of the MGC 50. In parallel, each of the endpoints that can dial-in to the MCU, can get a dial-in number via DMA 2212 and the appropriate EDTA 2211A or EDTB 2211B.

After initiating 312 the context, DM 228 may wait 314 for a period of D1, which can be in the range of few seconds to few minutes for example, and may get from CMA 2214 (FIG. 2c) status information regarding the conference. Based on this information a decision is made 320 whether there is a problem. Exemplary problems can include unsuccessful establishment of the conference, one or more conferees not being connected, etc. Alternatively, instead of step 314, CMA 2214 may be configured to send an interrupt to DM 228 informing DM 228 (FIG. 2c) that a problem exists in the setting of the conference. The interrupt may be sent with status information.

If 320 there is a problem DM 228 may communicate with DME 226 (FIG. 2c) looking 322 for an alternative solution based on information stored in the site section of the DB 222 (FIG. 2c) and related to the problematic conferee. Following are examples of solutions that can be offered by DME 226 in response to problems that might arise during an attempt to initiate a conference.

Problem 1: The MCU 114 (FIG. 1) has failed to establish a connection with a problematic conferee's MMEP 112 (FIG. 1) over an IP network. Information in the DB 222 that relates to the problematic conferee indicates that the MMED 112 can also communicate over an ISDN network using communication protocol H.320. Then an alternative solution exists 330 and method 300 returns to step 312 inform the appropriate EDr that is associated with the problematic MMEP, for example EDTB 2211B, about the new setting transferring the ISDN number that replaces the IP address to the EDTB and instruction to the MCU is sent via MCUC 2215 (FIG. 2c) requesting the MCU to establish a connection with the MMEP, according to the selected alternative, over the ISDN network using communication protocol H.320.

Problem 2: The problematic MMEP 112 (FIG. 1) can work only over an IP network; however, according to the information in the site section of DB 222 the conferee, which is associated with the problematic MMEP, also possesses a POTS telephone too. The telephone number of the conferee is retrieved from the site section of DB 222; method 300 returns to step 312, releases the relevant EDr (EDTB 2211B) and allocates another EDr, for example EDTA 2211A, which matches a POTS telephone. Then, a command is sent to the MCU to set an audio connection via the POTS telephone and add the problematic conferee as an audio conferee.

If at step 330 a decision is made that no alternative solution or setting exists, then the session is terminated 334; the allocated resources are released and method 300 proceeds to step 336. In an alternate embodiment the session (conference) may proceed if at least two or more conferees have been connected to the conference. In such an embodiment only the resources that have been allocated to the problematic one or more conferees are released 334 and method 300 proceeds to step 336.

Returning to step 320, if there is no indication to a problem, the process 300 of converting an audio session into a multimedia session is successfully terminated 340 and the multimedia session was established and running.

Figure 4:
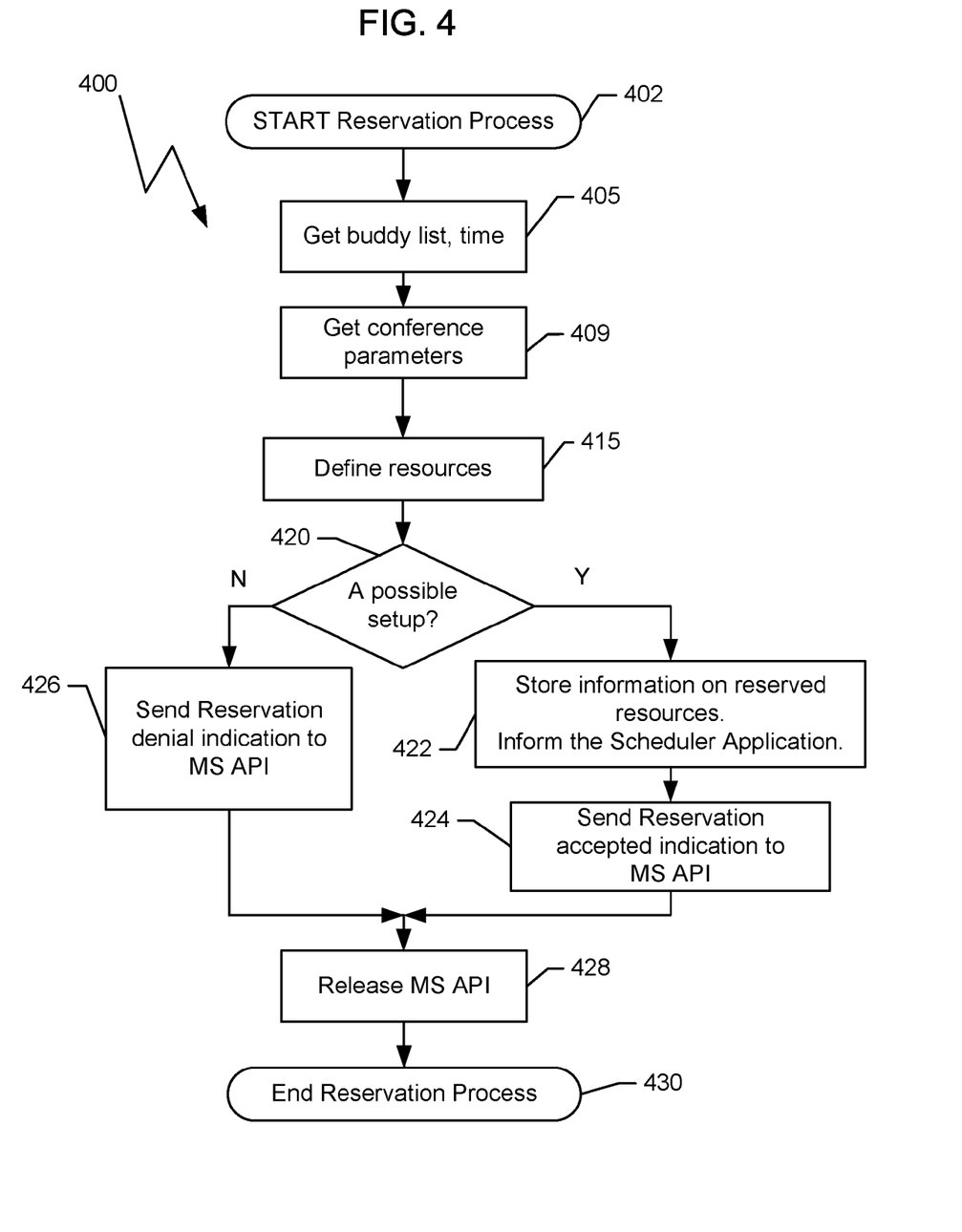
FIG. 4 is a flowchart illustrating relevant steps for reserving a conference.

FIG. 4 is a flowchart illustrating a process 400 for reserving a multimedia conference. Process 400 may be initiated 402 by a peer of the organization that wishes to reserve a conference (a moderator of the conference). In the exemplary organization 100 (FIG. 1) a user can schedule/reserve a conference by using his computer and communicate with Microsoft Exchange™ (MSEx) server 142 (FIG. 1). When the MSEx 142 is used for reserving a session the request is send by MSEx 142 via CM 295 (FIG. 2c) and API to MSEx 2342 (FIG. 2c) to DM 228 (FIG. 2c).

In one embodiment, the request to reserve a conference may also include information 405 concerning the participants, start time, duration etc. and/or a profile of the conference (the profile may give information on the types of layouts, criteria for replacing speaker, etc). In an alternate exemplary embodiment in which the above information is not associated with the request, this information is retrieved 405 from the user by prompting him to answer one or more questions via the MSEx 142 using the same modules that are used for receiving the request for reservation. Upon collecting 405 the information DM 228 may check with BuL reserve conference module 2362 (FIG. 2c) that the requester is authorized to reserve resources for the conference. If yes, method 400 may proceed to step 409. If no, a denial indication can be sent and method 400 may be terminated. At step 409 DM 228 may retrieve relevant information from the site section of DB 222 (FIG. 2). The relevant information can be Type of endpoints; dial numbers/IP address; etc.

A resource allocation process 415 & 420 can be conducted by DM 228 (FIG. 2c), DME 226 (FIG. 2c) and one or more MCUs 114 (FIG. 1). The communication with the one or more MCUs can be done via API 2342 (FIG. 2c). The decision can be based on a plurality of parameters including but not limited to the variety of endpoints that can be used by each buddy in the list, network's limitation, connection cost, quality of the video images, etc. Then the DB 222 can be searched for one or more MCUs that have available resources, which are needed for the reserved conference at the time of the reserved conference. DME 226 can recommend a best setup and topology for the session 415. If resources are available 420, then the allocation process 415 & 420 can be terminated and method 400 proceed to step 422.

DB 222 (FIG. 2c) may include information on previous reservation processes that were reserved and have not been established yet. The information may include indication concerning allocated resources. Furthermore, DB 222 may include information concerning the maximum resources that can be used in system 100 (FIG. 1) for conducting conferences as well as the resources that are currently used and that are currently available. In such embodiment, steps 415 and 420 can be preformed internally by DM 228, DME 226 and DB 222 without the needs to communicate with the one or more MCUs 114 (FIG. 1).

If resources are not available the allocation process 415 & 420 may continue and DME 226 may offer a second configuration. If resources are available 420 to support the second setup the allocation process 415 & 420 can be terminated and method 400 proceeds to step 422. If resources are not available the allocation process may continue and DME 226 may offer another configuration, etc. This loop can proceed until DME 226 may determine 420 that there is no possible setup that can be supported by the current available resources.

Finally, if resources 420 are not available method 400 may proceed to step 426 and deny the request for reservation. A denying message can be sent to the requester via MS API 2342 (FIG. 2c). After informing the requester, the allocated resources (MS API, for example) can be released 428, method 400 can be terminated 430, and DM 228 may recheck its queue for a next request.

Returning now to step 420, if resources are available, an indication of the reserved conference and its needed resources is stored. In one embodiment in which each MCU manages its reserved resources, the information is sent 422 and stored in the relevant MCU. In an alternate embodiment, the information on the reserved conference and its needed resources can be stored in DB 222. The information on the accepted reservation is transferred to a scheduling application, informing the scheduling application of the starting time and the location where information on the reserved conference is stored. When the time of the reserved conference arrives, the scheduling application may send an indication to DM 228 with information on the location in which the information on the reserved conference is stored. Based on this information DM 228 may start a reserved conference as disclosed below in conjunction with FIG. 5.

After informing 422 the relevant applications, method 400 sends a message 424 to the requester indicating that his request to reserve a conference is accepted. The message may include information on the parties, the time, and may include a conference ID number. During establishing the reserved conference, the conference ID number can be used to retrieve information about the reserved resources and to allow access to the parties. The message can be sent to the user via MS API 2342. Method 400 then proceeds to step 428 depicted above.

Figure 5:
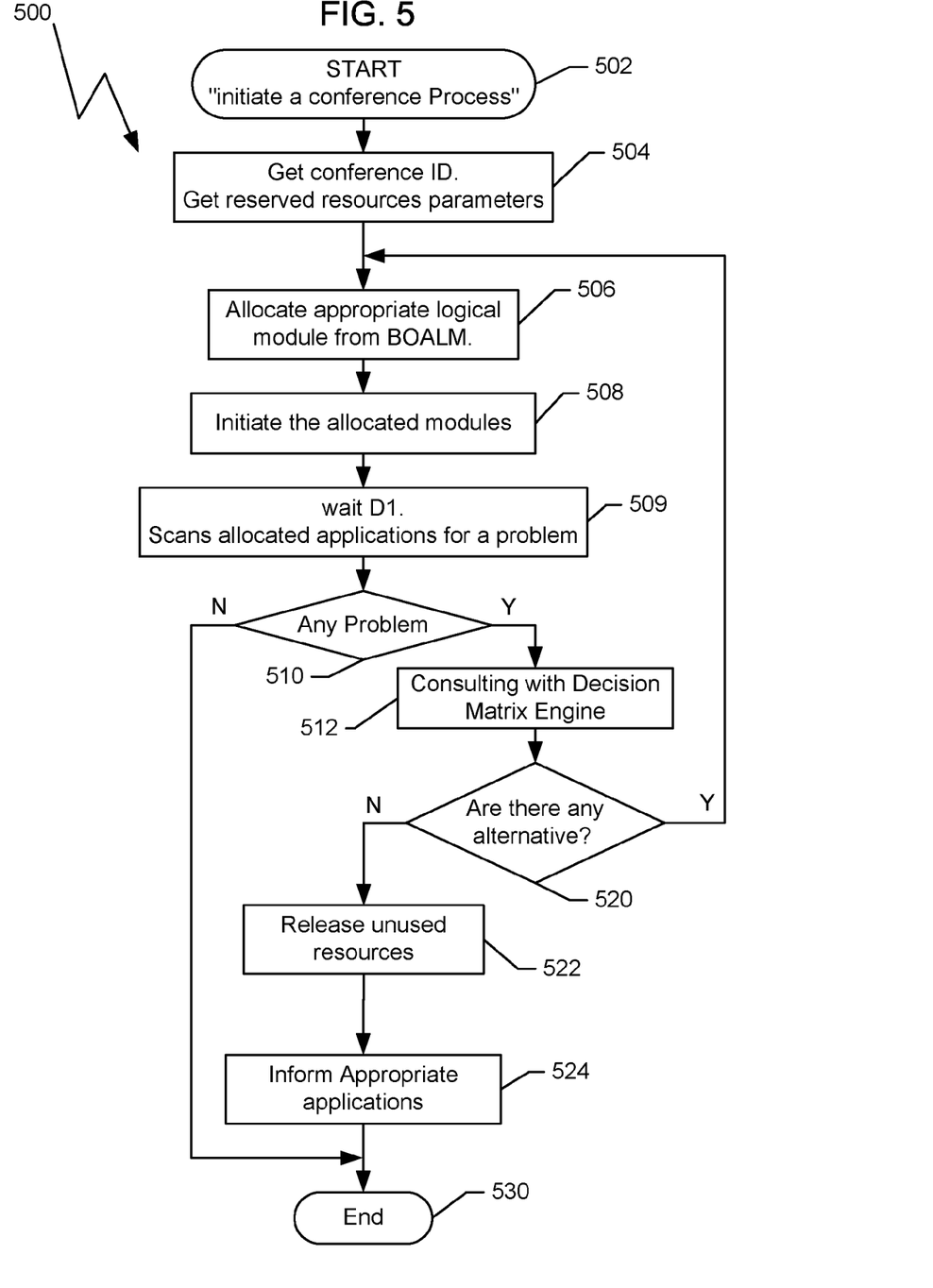
FIG. 5 is a flowchart illustrating relevant steps for starting a reserved conference.

FIG. 5 illustrates a flowchart showing relevant steps of an exemplary process 500 for starting a reserved conference. At step 502 the request to start a reserved conference is retrieved from the queue of DM 228 (FIG. 2c) and is processed by DM 228. The request may include the conference ID number that was allocated to the conference during the reservation process. The request can be sent to the queue of DM 228 at the appropriate time by the scheduling application based on the conference ID information about the reserved resources retrieved from DB 222. In alternate embodiment, information on the reserved resources can be sent with the request or may be retrieved from the MCU that reserved the resources.

According to the reserved resources, DM 228 can create 506 a new conference context 2210 (FIG. 2c) that will be associated with the conference. Appropriate modules are allocated to the context from BOALM 210 (FIG. 2c). The modules must match the allocated resources, i.e., the selected EDr 211 matches the selected endpoints (EDTA 2211A and EDTB 2211B FIG. 2c, for example), MCUC 2215 (FIG. 2c) matches the reserved MCU, etc. In addition, the two managing modules DMA 2212 and CMA 2214 are allocated to the context 2210. CMA 2214 can be informed on the location in the DB 222 from whence data relevant to the session can be retrieved. The information can include the dial out numbers of conferee's endpoint to which the MCU can dial, or dial-in numbers of the MCU to which some endpoints can dial in order to join the conference, etc. Then the modules of the new context 2210 are initiated 508 and context 2210 starts the conference establishing process with some or all of the reserved endpoints and the reserved MCU.

After its initiation CMA 2215 may start a process for establishing the session. For example, a list of dial-out numbers of endpoints which the allocated MCU must dial is sent to the MCU via MCUC 2215 and the API 2342 (FIG. 2c) of the MGC 50. In parallel, each of the endpoints that can dial-in to the MCU can receive a dial-in number via DMA 2212 and the appropriate EDTA 2211A or EDTB 2211B.

After initiating 508 the context, DM 228 may wait 509 for a period of D1, which can be in the range of few seconds to few minutes for example, and may get from CMA 2214 (FIG. 2c) status information regarding the conference. Based on this information, a decision is made 510 whether there is a problem. Exemplary problems can include unsuccessful establishment of the conference, one or more conferees cannot be connected, etc. Alternatively, instead of step 509, CMA 2214 may be configured to send an interrupt to DM 228 informing DM 228 (FIG. 2c) that a problem exists in the setting of the conference. The interrupt may be sent with status information to the queue of CMA 2214 via API 2342 and MCUC 2215 (FIG. 2c). If the conference was established without any problem, method 500 can be terminated 530 and DM 228 may apply to its queue for the next request.

If 510 a problem exists, then DM 228 may communicate with DME 226 (FIG. 2c) to look 512 for an alternative solution based on information stored in the site section of the DB 222 (FIG. 2c) and related to a problematic connection or an MCU. Following are examples of solutions that can be offered by DME 226 to problems that can arise when trying to initiate a reserved conference.

Problem 1: The MCU 114 (FIG. 1) has failed to establish a connection with a problematic conferee's MMEP 112 (FIG. 1) over an IP network. Information in the DB 222 that relates to the problematic conferee indicates that the MMED 112 can also work over an ISDN network using communication protocol H.320. Then an alternative solution exists 520 and method 500 returns to step 506 inform the appropriate EDr associated with the problematic MMEP, for example EDTB 2211B, about the new setting and transferring the ISDN number that replaces the IP address to the EDTB. Instruction to the MCU is sent via MCUC 2215 (FIG. 2c) requesting the MCU to establish a connection with the MMEP, according to the selected alternative, over the ISDN network using communication protocol H.320.

Problem 2: The reserved MCU fails to deliver the necessary resources. DM 228 may communicate with DME 226 (FIG. 2c) looking 520 for an alternative to the reserved MCU. If multimedia system 110 (FIG. 1) includes more than one MCU 114 then DM 228 may check if resources are available at the other MCUs via the appropriate API 2342 (FIG. 2c). If yes, context 2210 may be adapted to the needs of the new MCU. If there are no available MCUs, then an alternative approach to establish an audio session instead of multimedia can be offered by DME 226. In such a case DM 228 may check via API 2348 if the needed resources are available to match needs of the IPAEP 132 that the conferees have, etc.

If at step 520 a decision is made that no alternative solution or setting exists, then the session is terminated 522, the allocated resources are released, and method 500 proceeds to step 524. Alternatively, the session (conference) may proceed if at least two or more conferees have been connected to the conference, in which case only the resources allocated to the problematic one or more conferees are released 522 and method 500 proceeds to step 524.

At step 524 an indication is sent to the peers informing them of the problem. Method 500 can be terminated 530 and DM 228 may apply to its queue for the next request. The indication can be sent via the appropriate API to MS Exchange™ server in the above example.

In the present disclosure, the words "unit," "element," and "module" may be used interchangeably. Anything designated as a unit or module may be a stand-alone unit or a specialized or integrated module. A unit or a module may be modular or have modular aspects allowing it to be easily removed and replaced with another similar unit or module. Each unit or module may be any one of, or any combination of, software, hardware, and/or firmware. Those skilled in the art will appreciate that the subject matter of the present disclosure can be implemented in the form of software for an MCU, additional hardware added to an MCU, or additional software/hardware distributed among MCUs.

It will be appreciated that the above described apparatus, systems and methods may be varied in many ways, including, changing the order of steps, and the exact implementation used. The described embodiments include different features, not all of which are required in all embodiments of the present disclosure. Moreover, some embodiments of the present disclosure use only some of the features or possible combinations of the features. Different combinations of features noted in the described embodiments will occur to a person skilled in the art. Furthermore, some embodiments of the present disclosure can be implemented by combination of features and elements that have been described in association to different exemplary embodiments along the discloser. The scope of the invention is limited only by the following claims.

What is claimed is:

1. An apparatus for interfacing one or more multipoint control units (MCUs) and one or more conferencing devices, comprising:
 a middleware server comprising:
  a network interface for communicating with the one or more MCUs and conferencing devices;
  a computer readable medium comprising one or more device drivers for the one or more conferencing devices and one or more MCU controllers for the one or more MCUs;
  a processor programmed to:
   receive a request to initiate a conference between various of the one or more conferencing devices;
   determine resources necessary to conduct the conference;
   create a conference context associated with the conference, the conference context including the device drivers for only the one or more conferencing devices and the MCU controllers for only the one or more MCUs that will conduct the conference;
   initiate the conference context device drivers and MCU controllers; and
   instruct one or more of the conferencing devices to dial in to one or more of the MCUs or instruct one or more of the MCUs to dial out to one or more of the conferencing devices to conduct the conference.

2. The apparatus of claim 1 wherein the computer readable medium further comprises device manager and conference manager logical modules,
 wherein device manager and conference manager logical modules are included in the conference context, and
 wherein the device manager and conference manager logical modules are initiated from the conference context.

3. The apparatus of claim 1, further comprising one or more graphical user interfaces (GUI).

4. The apparatus of claim 1, wherein the one or more conferencing devices is a multimedia endpoint, internet protocol (IP) telephone, POTS telephone, private branch exchange (PBX), or IP-PBX.

5. The apparatus of claim 1, wherein the request to initiate a conference is a request from one of the conferencing devices to escalate an audio conference to a multimedia conference.

6. The apparatus of claim 1, further comprising a business logic module adapted to conform the requested conference according to one or more policies.

7. The apparatus of claim 6, wherein the one or more policies comprise permission to schedule the conference, permission to reserve multimedia resources, maximum number of conferees in a conference, type of multimedia layout, or method of selecting one or more speakers in a multimedia layout.

8. The apparatus of claim 1, further comprising a memory adapted to store the one or more device drivers and MCU controllers used by the processor.

9. The apparatus of claim 1, further comprising a module adapted to determine an optimum topology for the conference.

10. The apparatus of claim 1, wherein the processor is further programmed to:
   receive the request to initiate a conference from a management system;
   create and save a reservation indicating the resources for the conference in response to the request; and
   retrieve the reservation to allow creation of the conference context.

11. The apparatus of claim 10, wherein the processor is further programmed to:
   determine if the request to reserve a conference complies with the one or more conferencing policies; and
   if the request to reserve a conference does not comply with the one or more conferencing policy, send a denial message to the user;
   if the request to reserve a conference complies with the one or more conferencing policy, create and save the reservation.

12. A method for managing one or more multipoint control unit (MCUs) and one or more conferencing devices with a management system in an organization premises, comprising:
   receiving, at a middleware server, a request for a conference between various conferencing devices;
   determining resources necessary to conduct the conference;
   creating a conference context associated with the conference, the conference context including the device drivers for only the one or more conferencing devices and the MCU controllers for only the one or more MCUs that will conduct the conference;
   initiating the conference context device drivers and MCU controllers at the middleware server for the one or more conferencing devices or MCUs; and
   instructing the one or more conferencing devices to dial in to the one or more MCUs or instruct the one or more MCUs to dial out to the one or more conferencing devices to conduct the conference.

13. The method of claim 12, wherein the one or more conferencing-devices is a multimedia endpoint, internet protocol (IP) telephone, POTS telephone, private branch exchange (PBX), or IP-PBX.

14. The method of claim 12, wherein the request for a conference is a request from a management system and further comprising:
   creating and saving a reservation indicating the resources for the conference in response to the request; and
   retrieving the reservation to allow creation of the conference context.

15. The method of claim 12, wherein the request for a conference is a request from one of the conferencing devices to escalate an audio conference to a multimedia conference.

16. The method of claim 12, further comprising determining an optimum topology for a conference and establishing the conference according to the optimum topology.

17. The method of claim 12, further comprising retrieving one or more policies specific to the organization premises from the data storage and establishing the conference according to the one or more policies.

18. A middleware server for interfacing audio conferencing devices, multimedia conferencing devices, multipoint control units (MCUs) and a management system, comprising:
   a network interface for communicating with the audio conferencing devices, the multimedia conferencing devices, the MCUs and the management system;
   a computer readable storage medium comprising one or more device drivers for one or more multimedia conferencing devices and one or more MCU controllers for one or more MCUs;
   and
   a processor programmed to:
      receive, from a device associated with the audio conferencing system or from the management system, a request for a conference between various multimedia conferencing devices;
      determine resources necessary to conduct the conference;
      create a conference context associated with the conference, the conference context including the device drivers for only the multimedia conferencing devices and the MCU controllers for only the MCUs that will conduct the conference;
      initiate the conference context device drivers and MCU controllers at the middleware server; and
      instruct one or more of the multimedia conferencing devices to dial in to one or more of the MCUs or instruct one or more of the MCUs to dial out to one or more of the multimedia conferencing devices.

19. The middleware server of claim 18, further comprising a module used by the processor to determine an optimum topology for the conference.

20. The middleware server of claim 18, wherein the request for a conference is a request from an audio conferencing device to escalate an audio conference to a multimedia conference.

21. The middleware server of claim 18, wherein the processor is further programmed to:
   receive the request for a conference from the management system;
   create and save a reservation indicating the resources for the conference in response to the request; and
   retrieve the reservation to allow creation of the conference context.

22. The middleware server of claim 21, wherein the processor is further programmed to:
   determine if the request to reserve a conference complies with the one or more conferencing policies; and
   if the request to reserve a conference does not comply with the one or more conferencing policy, send a denial message;
   if the request to reserve a conference complies with the one or more conferencing policy, create and save the reservation.

* * * * *